United States Patent
Katsuma et al.

(10) Patent No.: US 7,457,223 B2
(45) Date of Patent: Nov. 25, 2008

(54) OBJECTIVE LENS FOR OPTICAL RECORDING MEDIA AND OPTICAL PICKUP DEVICE USING IT

(75) Inventors: Toshiaki Katsuma, Tokyo (JP); Yu Kitahara, Saitama (JP); Tetsuya Ori, Koshigaya (JP); Masao Mori, Saitama (JP)

(73) Assignee: Fujinon Corporation, Saitama (JP)

( * ) Notice: Subject to any disclaimer, the term of this patent is extended or adjusted under 35 U.S.C. 154(b) by 514 days.

(21) Appl. No.: 10/922,958

(22) Filed: Aug. 23, 2004

(65) Prior Publication Data

US 2005/0041560 A1    Feb. 24, 2005

(30) Foreign Application Priority Data

Aug. 21, 2003  (JP) .............................. 2003-297756
Mar. 31, 2004  (JP) .............................. 2004-105252

(51) Int. Cl.
*G11B 7/00*  (2006.01)
(52) U.S. Cl. ................................ 369/112.08; 369/110.03
(58) Field of Classification Search ............ 369/110.03, 369/112.06, 112.08
See application file for complete search history.

(56) References Cited

U.S. PATENT DOCUMENTS 6,330,118 B1 * 12/2001 Daschner et al. ............ 359/721
6,650,477 B2   11/2003 Nakai
2001/0008513 A1 *  7/2001 Arai et al. .............. 369/112.08
2003/0090987 A1 *  5/2003 Kitahara et al. ........ 369/112.24
2003/0107824 A1 *  6/2003 Takeuchi ..................... 359/796
2003/0185134 A1   10/2003 Kimura et al.
2003/0227858 A1 * 12/2003 Komma ................. 369/112.08
2003/0231536 A1 * 12/2003 Mizuno et al. .............. 365/200
2004/0213134 A1 * 10/2004 Takada et al. .......... 369/112.08

FOREIGN PATENT DOCUMENTS

JP         2003-67972        3/2003

* cited by examiner

*Primary Examiner*—Tan X Dinh
*Assistant Examiner*—Lixi Chow
(74) *Attorney, Agent, or Firm*—Arnold International; Jon W. Henry; Bruce Y. Arnold (57) ABSTRACT

An objective lens consists of two lens elements of different materials that are cemented. The lens surfaces that are cemented includes a phase function so that the cemented surface forms a optical diffractive surface that enables the objective lens to focus incident light of three different wavelengths with different numerical apertures onto different optical recording media. Three conditions are satisfied so as to achieve optimum imaging. The optical diffractive surface is shaped so that the order of the diffracted light of the shortest wavelength $\lambda 1$ having the largest diffracted intensity is zero and different from the order of the diffracted light of the second wavelength $\lambda 2$ having the largest diffracted intensity, and the order of the diffracted light of the first wavelength $\lambda 1$ having the largest diffracted intensity is also different from the order of the diffracted light of the third wavelength $\lambda 3$ having the largest diffracted intensity.

16 Claims, 2 Drawing Sheets

OBJECTIVE LENS FOR OPTICAL RECORDING MEDIA AND OPTICAL PICKUP DEVICE USING IT

BACKGROUND OF THE INVENTION

In recent years, a variety of optical recording media have been developed and optical pickup devices that carry out recording and reproducing using two alternative types of optical recording media have been known. For example, a system that carries out recording or reproducing with either a DVD (Digital Versatile Disk) or a CD (Compact Disk including CD-ROM, CD-R, CD-RW) has been used. For these two optical recording media, the DVD uses visible light having a wavelength of approximately 657 nm for improved recording densities while the CD is required to use near-infrared light having a wavelength of approximately 790 nm because there are some recording media that have no sensitivity to visible light. A single optical pickup device, known as a dual-wavelength-type pickup device, uses irradiation light of these two different wavelengths. The two optical recording media described above require different numerical apertures (NA) due to their different features. For example, the DVD is standardized to use a numerical aperture of 0.6 and the CD is standardized to use a numerical aperture in the range of 0.45-0.52. Additionally, the thicknesses of the two types of recording disks, including the thickness of a protective layer of polycarbonate (PC), are different. For example, the DVD may have a thickness of 0.6 mm and the CD may have a thickness of 1.2 mm.

Additionally, the amount of spherical aberration generated by the disk thickness varies with the thickness of the disk. Therefore, the amount of spherical aberration generated by the disk thickness is different for DVDs than for CDs. Consequently, in order to obtain precise focusing on the optical recording media regardless of the type of disk used, it is necessary to design optical systems that focus the light on the optical disks with varying amounts of convergence that take into account differences in spherical aberration for the light beams of different wavelengths that are used.

Specifically, in order to meet demands for reducing the size of the system, it is necessary to increase the degree of freedom in selecting the position of the optical system. As a result, it is considered advantageous to provide a configuration such that the light beams of different wavelengths from the light source or light sources are substantially parallel light beams when they are incident on the objective lens of the optical system that focuses the light on each optical recording medium.

For example, in Japanese Patent Application 2003-91382, the applicants of the present invention disclosed objective lenses for optical recording media that focus light beams to two different optical recording media for recording and reproducing information that strike the objective lenses as substantially parallel beams in order to result in favorable converging actions of the light beams for each of the two different optical recording media by using a optical diffractive surface as one of the objective lens surfaces. This allows much greater freedom in locating the optical system.

As the amount of data that is handled in everyday life rapidly increases, demands for increasing the amount of data optical recording media can record become urgent. In order to increase the amount of data that optical recording media can record, it is known to reduce the wavelength $\lambda$ of the light used and to increase the numerical aperture (NA) of the objective lens. For producing a short wavelength, a short wavelength semiconductor laser made from gallium nitride (a GaN laser), which emits laser light with a wavelength of 405 nm, useful for providing the recording and reproducing light, is being developed and put into practical use. With the development of short wavelength semiconductor lasers, research and development of AODs (Advanced Optical Disks), also known as HD-DVDs, that provide approximately 20 GB of data storage on a single side of an optical disk by using short wavelength light is in progress. As the AOD standard, the numerical aperture and disk thickness are selected to be close to, but slightly different from, those of the above-mentioned DVDs, with the numerical aperture (NA) and disk thickness for an AOD being set at 0.65 and 0.6 mm, respectively.

Additionally, research and development of Blu-ray disk systems that use a short wavelength of disk illuminating light is underway, and the values of the numerical aperture and disk thickness for those systems are completely different from the corresponding above-mentioned DVD and CD values, with a numerical aperture (NA) of 0.85 and a disk thickness of 0.1 mm being standard. Unless otherwise indicated, hereinafter, AOD and Blu-ray disk systems will be collectively referred to as AOD and the like systems.

Therefore, the development of an optical pickup apparatus that can be used for three types of optical recording media, such as AODs and the like, DVDs and CDs is expected, and an objective lens with which such optical recording media may be used has been proposed, for example, in Japanese Laid-Open Patent Application 2003-67972. This Japanese application teaches reducing spherical aberration by taking advantage of the magnification change of the objective lens with the light beams of different wavelengths that are used, and further reducing spherical aberration by using a wavelength selective filter in recording or reproducing using different kinds of optical recording media.

However, it is difficult to satisfy the condition discussed above that each light beam of a different wavelength from a light source for illuminating one of each of three different optical recording media be incident on the objective lens as a substantially parallel beam according to the teachings of Japanese Patent Application 2003-91382 and Japanese Laid-Open Patent Application 2003-67972 discussed above. In particular, objective lenses according to Japanese Patent Application 2003-91382 and Japanese Laid-Open Patent Application 2003-67972 may be arranged so that the light beams having wavelengths in use relative to one or two types of optical recording media are incident onto the objective lens as substantially parallel beams in order to favorably record or reproduce data on the different optical recording media, but it is technically difficult to achieve a substantially parallel incident beam when three different recording media are used.

Satisfying the desired conditions for three different types of recording media depends on favorably controlling the actions of the entire objective lens for each wavelength, that is, favorably controlling refractive actions of each surface of the objective lens where refraction occurs and favorably controlling diffractive actions of each surface of the objective lens where diffraction occurs. More specifically, by accurately controlling diffractive actions, as well as refractive actions, for each wavelength at a optical diffractive surface, even, for example, when only two optical recording media satisfy the requirements for desired focusing, as discussed above, the improvements in optical imaging in general can be quite substantial.

BRIEF SUMMARY OF THE INVENTION

The present invention relates to an objective lens for optical recording media that increases the freedom in selecting the position of the optical system, including the objective lens, that is usable for recording and reproducing data from any one of three different optical recording media using light beams of three different wavelengths and with three different numerical apertures of the objective lens, and that assures that the light beam of each different wavelength efficiently focuses at a respective desirable position on the corresponding optical recording medium by properly forming a lens surface as a optical diffractive surface. Efficient focusing is obtained even though the disk thicknesses of the three recording media may be different. The present invention further relates to an optical pickup device that uses such an objective lens.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention relates to an objective lens for optical recording media, wherein the objective lens includes two lens elements of different materials that are cemented together. The cemented surface of the two lens elements includes a phase function $\Phi$, as will be discussed in detail later, which results in the cemented surface being a optical diffractive surface that enables the objective lens to focus each of three different light beams of three different wavelengths, $\lambda 1$, $\lambda 2$, and $\lambda 3$ to a different desired position for each of first, second and third optical recording media of thicknesses, d1, d2, and d3, respectively. The optical diffractive surface is designed so that each of the three light beams is controlled favorably to a desired focus position with the three light beams all being incident on the objective lens as substantially parallel light. By enabling all three light beams to be incident as parallel light, the freedom in positioning and adjusting the positions of the various optical elements is greatly increased.

The NAs for the three recording media may be standardized NAs, the thicknesses of the three recording media may be standardized thicknesses, and the three wavelengths may be standardized wavelengths. The three NAs, wavelengths and thicknesses are selected so that the following Conditions (1)-(3) are satisfied:

| NA1 $\geq$ NA2 > NA3 | Condition (1) |
| $\lambda 1 < \lambda 2 < \lambda 3$ | Condition (2) |
| d1 $\leq$ d2 < d3 | Condition (3) | where

NA1 is the numerical aperture of the objective lens for light of the first wavelength $\lambda 1$ that is focused on the recording medium of thickness d1, NA2 is the numerical aperture of the objective lens for light of the second wavelength $\lambda 2$ that is focused on the recording medium of thickness d2, and NA3 is the numerical aperture of the objective lens for light of the third wavelength $\lambda 3$ that is focused on the recording medium of thickness d3.

The optical diffractive surface is shaped so that the order of the diffracted light of the first wavelength $\lambda 1$ having the largest diffracted intensity is different from the order of the diffracted light of the second wavelength $\lambda 2$ having the largest diffracted intensity, and the order of the diffracted light of the first wavelength $\lambda 1$ having the largest diffracted intensity is also different from the order of the diffracted light of the third wavelength $\lambda 3$ having the largest diffracted intensity.

Additionally, it is desirable that the optical diffractive surface of the objective lens be of serrated shape in cross-section. The terms "serrated" or "serrated shape" are used herein to mean a so-called kinoform shape (see page 120 of "Introduction to Diffraction Optics," published by Optronics Co. Ltd.) or a shape similar to that of stairs, a saw-tooth shape, or a shape which resembles a step.

Further, preferably the objective lens satisfies the following Conditions (4) and (5):

| h2/h1 $\leq$ 0.5 | Condition (4) |
| h3/h1 $\leq$ 0.5 | Condition (5) | where $h1 = \lambda 1 / |N1_{\lambda 1} - N2_{\lambda 1}|$, $h2 = \lambda 2 / |N1_{\lambda 2} - N2_{\lambda 2}|$ and $|N1_{\lambda 2} - N2_{\lambda 2}| >$ zero, $h3 = \lambda 3 / |N1_{\lambda 3} - N2_{\lambda 3}|$ and $|N1_{\lambda 3} - N2_{\lambda 3}| >$ zero, $N1_{\lambda 1}$, is the refractive index of the material of the first lens element at the first wavelength $\lambda 1$, $N2_{\lambda 1}$, is the refractive index of the material of the second lens element at the first wavelength $\lambda 1$, $N1_{\lambda 2}$ is the refractive index of the material of the first lens element at the second wavelength $\lambda 2$, $N2_{\lambda 2}$ is the refractive index of the material of the second lens element at the second wavelength $\lambda 2$, $N1_{\lambda 3}$ is the refractive index of the material of the first lens element at the third wavelength $\lambda 3$, and $N2_{\lambda 3}$ is the refractive index of the material of the second lens element at the third wavelength $\lambda 3$.

Thus, h1 is equal to infinity when $N1_{\lambda 1} - N2_{\lambda 1}$ is equal to zero, that is, when the refractive index $N1_{\lambda 1}$ of the material of the first lens element at the first wavelength $\lambda 1$ is equal to the refractive index $N2_{\lambda 1}$ of the material of the second lens element at the first wavelength $\lambda 1$. In that case, both h2/h1 of Condition (4) and h3/h1 of Condition (5) are also equal to zero.

It is also desirable that at least one of the light source side or the optical recording media side of the objective lens be an aspheric surface. Additionally, it is desirable that each of the three light beams of the three different wavelengths, $\lambda 1$, $\lambda 2$, and $\lambda 3$, be incident on the objective lens as a parallel beam of light. Further, the objective lens of the present invention is desirably used in an optical pickup device.

The invention will first be discussed in general terms with reference to FIGS. 1A-1C that show the geometry of the objective lens and various related recording media of the present invention and FIG. 2 that shows an optical pickup device using the objective lens of FIG. 1.

Figure 2:
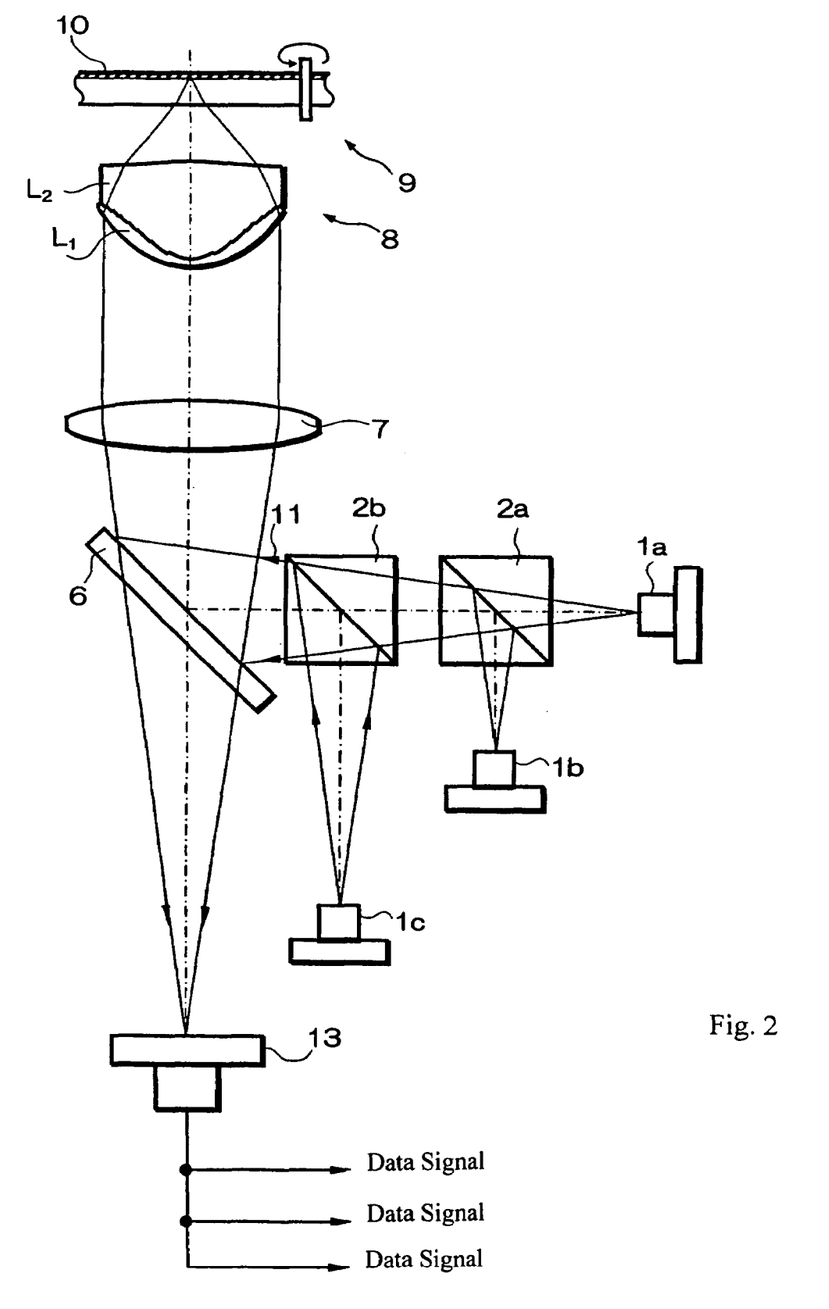
FIG. 2 is a schematic diagram of an optical pickup device using the objective lens of FIGS. 1A-1C.

As shown in FIG. 2, a laser beam 11 that is emitted by a selected one of the semiconductor lasers 1a-1c is reflected by a half mirror 6, collimated by a collimator lens 7, and converged by an objective lens 8 so as to be focused onto a recording area 10 of an optical recording medium 9 so that Conditions (1)-(3) above are satisfied.

Figure 1A:
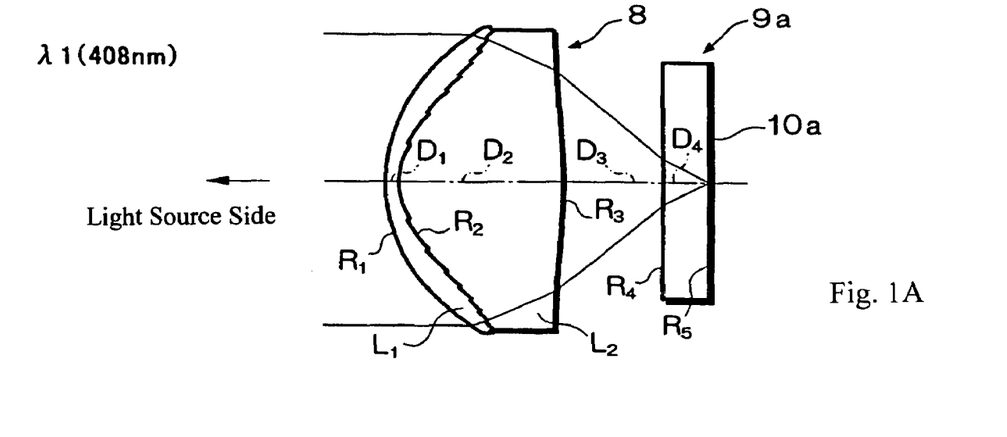
FIGS. 1A-1C are schematic diagrams that depict cross-sectional views of the optical recording objective lens of an embodiment of the present invention, with FIG. 1A showing the operation of the objective lens when used with recording medium 9a, with FIG. 1B showing the operation of the objective lens when used with a different recording medium 9b, and with FIG. 1C showing the operation of the objective lens when used with a different recording medium 9c.
Figure 1B:
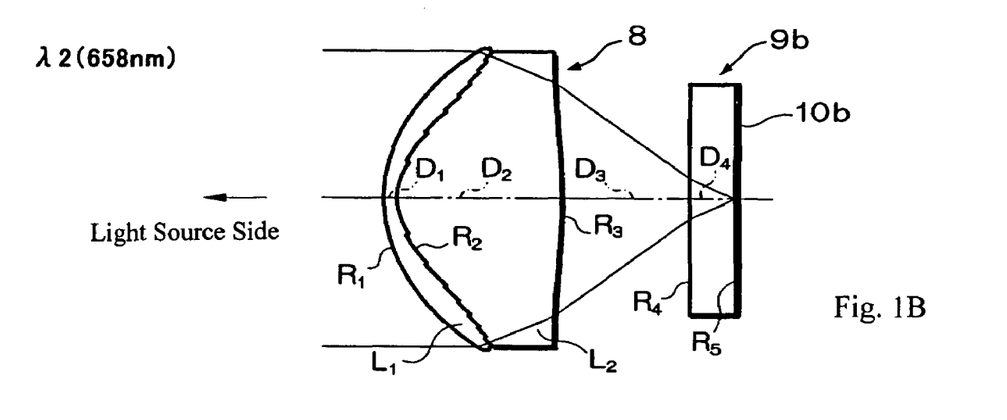
Figure 1C:
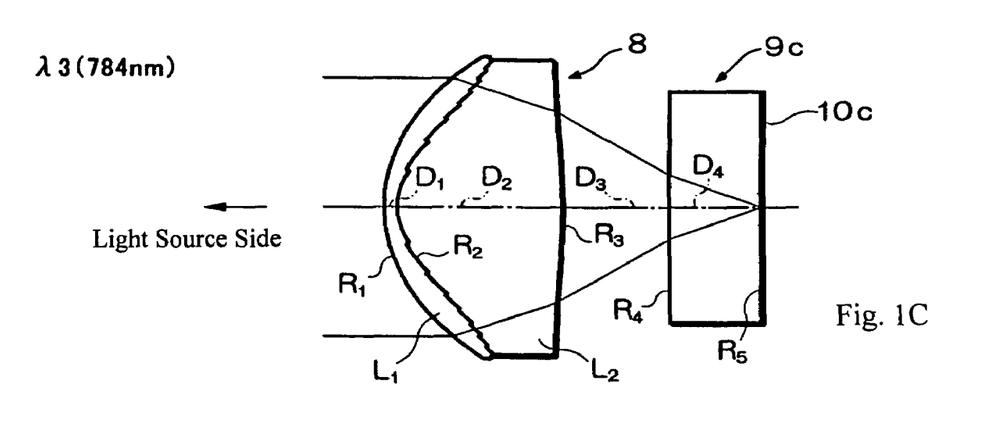

The optical recording medium 9 of FIG. 2 generically illustrates three possible recording media illustrated individually in FIGS. 1A-1C: (a) AOD 9a of FIG. 1A that is used with a numerical aperture NA1 of 0.65 of the objective lens 8, with a light beam of wavelength $\lambda 1$ of 408 nm, and with a disk thickness $D_4$ of 0.6 mm; (b) DVD 9b of FIG. 1B that is used with a numerical aperture NA2 of 0.60 of the objective lens 8, with a light beam of wavelength $\lambda 2$ of 658 nm and with a disk thickness $D_4$ of 0.6 mm; and (c) CD 9c of FIG. 1C that is used with a numerical aperture NA3 of 0.51 of the objective lens 8, with a light beam of wavelength $\lambda 3$ of 784 nm, and with a disk thickness $D_4$ of 1.2 mm.

The semiconductor laser 1a is a light source for outputting a laser beam in the visible light region having a wavelength of about 408 nm ($\lambda 1$) for an AOD recording medium; the semiconductor laser 1b is a light source for outputting a laser beam in the visible light region having a wavelength of 658 nm ($\lambda 2$) for a DVD recording medium; and the semiconductor laser 1c is a light source for outputting a laser beam in the near infrared region having a wavelength of about 784 nm ($\lambda 3$) for a CD recording medium, with CD herein being a generic term for various recording media such as CD-R (recordable optical recording medium).

The arrangement of FIG. 2 does not preclude semiconductor lasers 1a-1c from providing simultaneous outputs. However, it is desirable that the lasers be used alternately depending on whether the optical recording medium 9 of FIG. 2 is specifically, as shown in FIGS. 1A-1C, an AOD 9a, a DVD 9b, or a CD 9c. As shown in FIG. 2, the laser beam output from the semiconductor lasers 1a, 1b irradiates the half mirror 6 by way of prisms 2a, 2b, and the laser beam output from the semiconductor laser 1c irradiates the half mirror 6 by way of the prism 2b only.

The collimator lens 7 is schematically shown in FIG. 2 as a single lens element. However, it is desirable to use a collimator lens made up of more than one lens element in order to better correct chromatic aberration of the collimator lens 7.

In an optical pickup apparatus of the present invention, each of the optical recording media 9, as shown in FIG. 2, whether AOD 9a, DVD 9b or CD 9c of FIGS. 1A-1C, respectively, must be arranged at a predetermined position along the optical axis so that the recording region 10 of FIG. 2 (one of the recording regions 10a, 10b, and 10c of AOD 9a, DVD 9b and CD 9c of FIG. 1) is positioned at the focus of the light beam of the corresponding wavelength ($\lambda 1$, $\lambda 2$, and $\lambda 3$ for recording regions 10a, 10b, and 10c, respectively) in order to properly record signals and reproduce recorded signals.

In the recording region 10, pits carrying signal information are arranged in tracks. The reflected light of a laser beam 11 is made incident to the half mirror 6 by way of the objective lens 8 and the collimator lens 7 while carrying the signal information, and the reflected light is transmitted through the half mirror 6. The transmitted light is then incident on a four-part photodiode 13. The respective quantities of light received at each of the four parts of the four-part photodiode 13 are arithmetically operated upon, whereby data signals and respective error signals for focusing and tracking are obtained.

Because the half mirror 6 is inserted into the optical path of the return light from the optical recording media 9 at a forty-five degree angle to the optical axis, the half mirror 6 introduces astigmatism into the light beam, as a cylindrical lens may introduce astigmatism, whereby the amount of focusing error may be determined according to the form of the beam spot of the return light on the four-part photodiode 13. In this arrangement, the collimator lens 7 can sometimes be omitted. Also, a grating may be inserted between the semiconductor lasers 1a-1c and the half mirror 6 so that tracking errors can be detected using three beams.

As shown in FIGS. 1A-1C and FIG. 2, the objective lens 8 of the present invention includes two lens elements of different materials that are cemented together. The facing surfaces that are cemented together includes a phase function so that the cemented surface becomes a optical diffractive surface. With this construction, the objective lens of the present invention operates in order to perform the desired optical functions, such as focusing the light beams of different wavelengths $\lambda 1$, $\lambda 2$, and $\lambda 3$ to different desired positions along the optical axis, based on taking advantage of the refractive and diffractive properties of the objective lens of the present invention, including the refractive and diffractive properties of the cemented surface.

Conventionally, when two kinds of optical recording media having disk thicknesses that are different from each other are used in an optical pickup device, it has been known to optimize the differences in spherical aberration of two light beams having different wavelengths by using a optical diffractive surface. In these optical recording media, the amounts of spherical aberration generated differ mainly due to the differences in the thicknesses of the protective layers of the recording media. However, through its placement and its diffractive effects on the light beams of different wavelengths, the optical diffractive surface of the present invention helps correct aberrations due to differences in the converging action of the optical diffractive surface at the different wavelengths. Thus, the objective lens 8 can be favorably used to provide proper focusing of the light beams of the three different wavelengths on the recording regions of the corresponding three recording media. This favorable use includes operation with all three light beams being incident on the objective lens 8 as substantially parallel light beams, as set forth above.

The objective lens of the present invention is designed to make it easier to satisfy various conditions related to the use of light beams of three wavelengths that differ from one another. Previously, in dual-wavelength light beam objective lenses for optical recording media with a optical diffractive surface, a single lens element configuration having a optical diffractive surface on one side has been used as the most simple configuration. Either the light source side or the optical recording media side of the optical diffractive surface is air, which means that the refractive index on one side of the optical diffractive surface is not a parameter that may be varied, but rather is the fixed value of the refractive index of air.

In contrast, in the present invention, the refractive index on each side of the optical diffractive surface may be chosen by choosing the materials of the first lens element and the second lens element of the objective lens. Thus, the present invention provides much greater freedom in determining the indexes of refraction and the differences in the indexes of refraction of the materials on the light source side and the optical recording media side of the optical diffractive surface, which helps determine the refractive and diffractive effects at each of the three wavelengths. By taking advantage of this freedom of choice, the light refractive and diffractive actions at the optical diffractive surface for each light beam of a different wavelength can be favorably controlled. This is the reason the objective lens of the present invention is composed of two lens elements of different materials that are cemented together. By setting the refractive index of the two lens elements properly, the objective lens 8 can be designed to operate on each of the three light beams in order to provide desired imaging of the three light beams even though the three light beams have different wavelengths.

By allowing all three of the light beams of different wavelengths to be incident on the objective lens 8 as parallel light beams, the distance between the collimator lens 7 and the objective lens 8 can be set as desired in order to increase the freedom in selection of the positions of the various optical elements, including those related to the folding of the optical paths.

Additionally, by the objective lens being a cemented lens, the objective lens can be simply supported, for example, without requiring a lens tube to support the objective lens.

The cemented surface of the objective lens 8 has a general aspheric shape and the aspheric shape is defined using Equation (A) below:

$$Z=[(CY^2)/\{1+(1-K\cdot C^2\cdot Y^2)^{1/2}\}]+\Sigma(A_i\cdot Y^{2i})\qquad\text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, R) of the aspheric lens surface on the optical axis, Y is the distance (in mm) from the optical axis, K is the eccentricity, and $A_i$ is the ith aspheric coefficient, and the summation extends from i=2 upwards.

Additionally, as described above, it is desirable that the cross-sectional shape of the optical diffractive surface of the objective lens be of serrated shape, with the terms "serrated" or "serrated shape" being used herein to mean a so-called kinoform shape or a shape similar to that of stairs. In FIGS. 1A-1C and FIG. 2, for purposes of illustration, the serrated shape of the optical diffractive surface is exaggerated from that of an actual optical diffractive surface. The optical diffractive surface adds a difference in optical path length equal to $m\cdot\lambda\cdot\Phi/(2\pi)$ to the diffracted light, where m is the diffractive order, $\lambda$ is the wavelength and $\Phi$ is the phase function of the optical diffractive surface. The phase function $\Phi$ is given by the following equation:

$$\Phi=\Sigma W_i\cdot Y^{2i}\qquad\text{Equation (B)}$$

where

Y is distance from the optical axis; and $W_i$ is a phase difference coefficient.

The step height of the serrated shape of the optical diffractive surface is determined in detail by considering the diffracted light of each order for each wavelength of each light beam. Additionally, the outer diameter of the optical diffractive surface can be determined by considering the numerical apertures and beam diameters of the three light beams of the three wavelengths that make up the laser beam 11. It is desirable that the optical diffractive surface and the aspheric surface or aspheric surfaces formed on the objective lens 8 be designed so that, as shown in FIGS. 1A-1C, each of the light beams of the three wavelengths is focused at positions where corresponding recording regions, 10a, 10b, and 10c, respectively, are located with favorable correction of aberrations.

Additionally, the optical diffractive surface is preferably shaped so that the order of the diffracted light of the first wavelength $\lambda 1$ (such as 408 nm) that has the largest diffracted intensity may be different from the order of the diffracted light of the second wavelength $\lambda 2$ (such as 658 nm) that has the largest diffracted intensity. Moreover, the order of the diffracted light of the first wavelength $\lambda 1$ (such as 408 nm) that has the largest diffracted intensity may be different from the order of the diffracted light of the third wavelength $\lambda 3$ (such as 784 nm) that has the largest diffracted intensity.

By so using light beams of different wavelengths diffracted into different orders, laser beams for properly focusing onto AOD, DVD, and CD recording media can be produced. In particular, favorable focusing may be achieved by the order of the diffracted light of the first wavelength $\lambda 1$, which may be 408 nm, where the quantity of diffracted light is maximized for an AOD being the zero-order diffracted light and the order of the diffracted light of the second wavelength $\lambda 2$, which may be 658 nm, where the quantity of diffracted light is maximized for a DVD and the order of the diffracted light of the third wavelength $\lambda 3$, which may be 784 nm, where the quantity of diffracted light is maximized for a CD, both being first-order diffracted light.

As described above, the objective lens 8 is designed for three light beams, each with a different wavelength, by using different materials with different refractive indexes on each side of a cemented optical diffractive surface. However, the refractive indexes of the two materials may become the same for one or more of the three wavelengths depending on the particular lens materials and wavelengths used. In this case, the optical diffractive surface has no diffractive effect on the light beam of a wavelength where the zero-order diffracted light is being maximized (about one hundred per cent zero-order diffracted light is produced) and the objective lens 8 acts as if it were a uniform single lens element and the light beam of that wavelength is converged only by the refractive effects of the outer lens surfaces of the objective lens 8.

In fact, the percentage of zero-order diffractive light never becomes one hundred percent, but rather when the difference in the refractive indexes is minimized for a laser beam having a wavelength of 408 nm, which is the smallest of the three wavelengths, and when used for irradiating AODs, the zero-order diffracted light may be maximized to approach the one hundred per cent value.

When the serrated-shaped step height is designed so that the amount of diffractive light of the first order is maximized relative to the laser beam of wavelength at 658 nm ($\lambda 2$) for a DVD as the second wavelength by satisfying Condition (4) above, the amount of diffractive light at the zero-order becomes the maximum relative to the laser beam of a wavelength at 408 nm ($\lambda 1$) for an AOD as the first wavelength. Moreover, when the serrated-shaped step height is designed so that the amount of diffractive light of the first order is maximized relative to the laser beam of wavelength at 784 nm ($\lambda 3$) for a CD as the third wavelength by satisfying Condition (5) above, the amount of diffractive light at the zero-order is maximized relative to the laser beam of the wavelength at 408 nm ($\lambda 1$) for an AOD as the first wavelength. The amount of diffractive light at the zero-order of the laser beam of the wavelength at 408 nm ($\lambda 1$) for an AOD favorably increases as the values of h2/h1 and h3/h1 approach zero and the values of Conditions (4) and (5) are within the allowable ranges.

As described above, the configuration of the optical diffractive surface of the objective lens is such that the amount of diffracted light of zero-order or first-order of the light beams of the three different wavelengths are maximized in a highly effective manner by using steps of the serrated shape that are shallow so that production of the objective lens is relatively easy.

Additionally, by forming at least one of either the light source side surface or the optical recording media side surface of the objective lens as an aspheric surface according to Equation (A) above, as is done with the cemented surface of the objective lens, as described above, aberrations at the focus of each of the three different wavelengths for the three different recording media can be favorably corrected in order to achieve faithful recording and reproduction.

A particular embodiment of an objective lens of the present invention will now be described in detail. As shown in FIGS. 1A-1C and FIG. 2, the objective lens 8 is a cemented lens formed of a first lens element $L_1$ on the light source side and a second lens element $L_2$ on the optical recording media side, all the surfaces of the objective lens 8 are aspheric, and the cemented surface of $L_1$ and $L_2$ is aspheric and diffractive. As indicated in FIGS. 1A-1C, the objective lens 8 favorably focuses light of each wavelength, $\lambda 1$ of 408 nm, $\lambda 2$ of 658 nm, and $\lambda 3$ of 784 nm, onto a respective recording region 10a, 10b, or 10c of respective recording media 9a, 9b, and 9c, which may be an AOD, a DVD, or a CD. The objective lens operates with an infinite conjugate on the light source side with the substantially parallel light beams of all three wavelengths being incident on the objective lens 8.

Table 1 below lists the surface #, in order from the light source side, the surface type or radius of curvature (in this case, the radii of curvature are given for planar surfaces, which have a radius of curvature of infinity), the on-axis distance (in mm) between surfaces for the three used wavelengths ($\lambda 1$=408 nm for the AOD 9a, $\lambda 2$=658 nm for the DVD 9b, and $\lambda 3$=784 nm for the CD 9c), and the refractive indexes at the three used wavelengths.

TABLE 3

| | $1^{st}$ Surface | $2^{nd}$ Surface (Cemented Surface) | $3^{rd}$ Surface |
|---|---|---|---|
| C | 5.163061248E−1 | 9.757129489E−1 | −1.495704318E−1 |
| K | 0.0 | 0.0 | 0.0 |
| $A_2$ | 7.902760583E−3 | −3.062630276E−2 | 2.130533210E−2 |
| $A_3$ | 5.016521396E−4 | −7.270188067E−3 | −2.351847773E−3 |
| $A_4$ | 1.140142064E−4 | 3.879921571E−4 | −1.096253958E−4 |
| $A_5$ | 1.579095336E−6 | 1.275018075E−4 | 3.300847945E−5 |

Table 4 below lists the values of the phase difference coefficients $W_1$-$W_5$ of the $2^{nd}$ Surface that form a diffraction optical surface of the objective lens of this embodiment. Phase difference coefficients not listed in Table 4 are zero. Once again, an "E" in the data indicates that the number following the "E" is the exponent to the base 10.

TABLE 4

| $W_1$ | 1.855773619E+2 |
|---|---|
| $W_2$ | 5.754177293 |
| $W_3$ | −4.261059549 |
| $W_4$ | −5.824551313E−3 |
| $W_5$ | 7.029500316E−2 |

TABLE 1

| # | Surface Type or Radius of Curvature | Surface Spacing | | | Refractive Index | | |
|---|---|---|---|---|---|---|---|
| | | $\lambda$ = 408 nm | $\lambda$ = 658 nm | $\lambda$ = 784 nm | $\lambda$ = 408 nm | $\lambda$ = 658 nm | $\lambda$ = 784 nm |
| 1 | aspheric | 0.170 | 0.170 | 0.170 | 1.55869 | 1.52426 | 1.52127 |
| 2 | diffractive, aspheric | 2.190 | 2.190 | 2.190 | 1.55636 | 1.54076 | 1.53704 |
| 3 | aspheric | 1.326 | 1.685 | 1.409 | 1.00000 | 1.00000 | 1.00000 |
| 4 | ∞ | 0.600 | 0.600 | 1.200 | 1.61800 | 1.57800 | 1.57200 |
| 5 | ∞ | | | | | | |

Table 2 below lists, for each used wavelength, the diaphragm diameter DD (in mm), the focal length f (in mm), the numerical aperture NA and the apparent light source position (as measured from the first surface).

TABLE 2

| | $\lambda$ = 408 nm | $\lambda$ = 658 nm | $\lambda$ = 784 nm |
|---|---|---|---|
| diaphragm diameter, DD | 3.90 | 4.02 | 3.52 |
| focal length, f | 3.00 | 3.35 | 3.45 |
| numerical aperture, NA | 0.65 | 0.60 | 0.51 |
| light source position | ∞ | ∞ | ∞ |

Table 3 below lists the values of C, K and the aspheric coefficients $A_2$-$A_5$ of each aspheric surface of this embodiment, numbered from the light source side and including the cemented surface, that are used in Equation (A) above. An "E" in the data indicates that the number following the "E" is the exponent to the base 10. For example, "1.0E-2" represents the number $1.0 \times 10^{-2}$. Aspheric coefficients that are not listed in Table 3 are zero.

As is clear from Tables 1 and 2 above, the objective lens of the embodiment described above satisfies Conditions (1)-(3). Additionally, the objective lens of the embodiment described above satisfies Conditions (4) and (5) as set forth in Table 5 below, based on the refractive index values at the three wavelengths, $\lambda 1$=408 nm, $\lambda 2$=658 nm, $\lambda 3$=784 nm, from Table 1 above.

TABLE 5

| Condition No. | Condition | Value |
|---|---|---|
| (4) | h2/h1 ≦ 0.5 | 0.23 (h1 = 175107.296 nm, h2 = 39878.788 nm) |
| (5) | h3/h1 ≦ 0.5 | 0.28 (h1 = 175107.296 nm, h3 = 49714.648 nm) |

The objective lens of the present invention can be modified in various ways without being restricted to that of the specific embodiment described above. Similarly, the optical pickup apparatus of the present invention can be modified in various ways.

For example, plastic material can be used as the material of one or both of the lens elements $L_1$ and $L_2$ in order to reduce the weight and cost of the objective lens. Additionally, as the material for one of the lens elements $L_1$ or $L_2$, a heat or light cured resin may be used so that a so-called multiplexed aspheric lens may be made by replica processing that inexpensively produces a cemented aspheric lens with an optical diffractive surface. For example, in the above embodiment, an ultraviolet ray curing resin may be applied to one side of the lens element $L_2$ so as to form the light source side lens element $L_1$. The lens $L_1$ is then cured by irradiating the resin with predetermined ultraviolet light while simultaneously pressing the resin within a predetermined mold.

Additionally, in the embodiment described above, the optical diffractive surface is designed so that the amounts of first-order diffracted laser light for a wavelength $\lambda 2$ of 658 nm for a DVD and for a wavelength $\lambda 3$ of 784 nm for a CD are equally maximized.

Also, the optical diffractive surface of the objective lens may be designed so that the diffracted light intensity at one or more wavelengths is maximized at another predetermined diffractive order. When this is done, it is desirable to diffract nearly one hundred per cent of the incident light of a given wavelength into the predetermined diffractive order.

Moreover, in the embodiment of the objective lens described above, all the surfaces of the objective lens are aspheric, which helps correct aberrations. However, spherical surfaces may be used instead of aspheric surfaces. Additionally, it is also possible to configure the objective lens with an aspheric surface only on the light source side or only on the optical recording media side of the objective lens.

Also, the objective lens for use with optical recording media and the optical pickup device of the present invention have been described as configured so that the light beam having a wavelength corresponding to the appropriate optical recording medium is incident as a parallel beam on the light source side surface of the objective lens. However, a light beam of one or more wavelengths may be incident on the light source side surface of the objective lens as a slightly diverging light beam or as a slightly converging light beam with the objective lens still serving to favorably focus the light beams of all three wavelengths on a corresponding one of three optical recording media. Either a slightly converging light beam or a slightly diverging light beam is herein defined as a nearly parallel light beam, as compared to a light beam that is a substantially parallel light beam. Thus, a parallel or nearly parallel light beam is a light beam that is a substantially parallel light beam, a slightly converging light beam, or a slightly diverging light beam.

Furthermore, the optical recording media to be recorded and reproduced in the optical pickup device of the present invention are not restricted to the combination of AOD, DVD and CD. The present invention relates generally for use with the optical recording media where Conditions (1)-(3) are satisfied. For example, instead of a design based on AOD recording and reproducing at one of the three wavelength, a design may be based on Blu-ray technology, which may be used with a numerical aperture of 0.85, Blu-ray disk thickness of 0.1 mm and a light beam with a wavelength of 405 nm. Similarly, when an AOD, DVD and CD are used as optical recording media, the wavelengths of the light beams used is not restricted to the particular embodiment described in the tables above. A light beam having a wavelength other than the wavelength of a light beam in use for an AOD of 408 nm, other than the wavelength of a light beam in use for a DVD of 658 nm, and/or other than the wavelength of a light beam in use for a CD of 784 nm can be used as long as the standards for satisfactory focusing of the light beam, as described above, are satisfied. Similar considerations apply to variations in numerical apertures of the objective lens for a given light beam with a given wavelength and to variations in disk thicknesses for optical recording media used with a given light beam of a given wavelength.

Also, the objective lens for use with optical recording media and the optical pickup device of the present invention are not limited to use with three types of optical recording media. Even when different wavelength light beams are used with only two optical recording media, the light beams may be incident on the light source side of the objective lens as substantially parallel beams, and the objective lens may produce very favorable and efficient focusing of the different wavelength light beams on two optical recording media. Additionally, different wavelength light beams may also be used with four or more kinds of optical recording media in a single optical pickup device.

Additionally, although in the optical pickup devices described above three light sources that output light beams having wavelengths that differ from each other are used, a single light source that outputs two light beams having wavelengths different from each other can be used as a light source. An aperture or aperture control device with wavelength selectivity can be placed on the light source side of the objective lens. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An objective lens for use with optical recording media, the objective lens consisting of two lens elements of different materials with surfaces that are cemented together, wherein:

the lens surfaces that are cemented together include a phase function $\Phi$ so that the cemented surface becomes an optical diffractive surface that enables the objective lens to focus incident light of a first wavelength $\lambda 1$ at a first numerical aperture NA1 onto a desired portion of a first optical recording medium having a thickness d1, that enables the objective lens to focus incident light of a second wavelength $\lambda 2$ at a second numerical aperture NA2 onto a desired portion of a second optical recording medium having a thickness d2, and that enables the objective lens to focus incident light of a third wavelength $\lambda 3$ at a third numerical aperture NA3 onto a desired portion of a third optical recording medium having a thickness d3;

the optical diffractive surface is shaped so that the order of the diffracted light of the first wavelength $\lambda 1$ having the largest diffracted intensity is different from the order of the diffracted light of the second wavelength $\lambda 2$ having the largest diffracted intensity, the order of the diffracted light of the first wavelength $\lambda 1$ having the largest diffracted intensity is also different from the order of the diffracted light of the third wavelength $\lambda 3$ having the largest diffracted intensity, and the order of the diffracted light of the first wavelength $\lambda 1$ having the largest diffracted intensity is the zero-order; and said phase function $\Phi$ is given by the following equation:

$$\Phi = \Sigma W_i \cdot Y^{2i}$$

where

Y is distance from the optical axis; and $W_i$ is a phase difference coefficient, and the following conditions are satisfied:

$$NA1 \geq NA2 > NA3$$

$$\lambda 1 < \lambda 2 < \lambda 3$$

$$d1 \leq d2 < d3.$$

2. The objective lens according to claim 1, wherein:
the two lens elements are a first lens element and a second lens element; and
the following conditions are satisfied:

$$h2/h1 \leq 0.5$$

$$h3/h1 < 0.5$$

where $$h1 = \lambda 1/|N1_{\lambda 1} - N2_{\lambda 1}|,$$

$$h2 = \lambda 2/|N1_{\lambda 2} - N2_{\lambda 2}| \text{ and } |N1_{\lambda 2} - N2_{\lambda 2}| > \text{zero},$$

$$h3 = \lambda 3/|N1_{\lambda 3} - N2_{\lambda 3}| \text{ and } |N1_{\lambda 3} - N2_{\lambda 3}| > \text{zero},$$

$N1_{\lambda 1}$ is the refractive index of the material of said first lens element at the first wavelength $\lambda 1$,
$N2_{\lambda 1}$ is the refractive index of the material of said second lens element at the first wavelength $\lambda 1$,
$N1_{\lambda 2}$ is the refractive index of the material of said first lens element at the second wavelength $\lambda 2$,
$N2_{\lambda 2}$ is the refractive index of the material of said second lens element at the second wavelength $\lambda 2$,
$N1_{\lambda 3}$ is the refractive index of the material of said first lens element at the third wavelength $\lambda 3$, and
$N2_{\lambda 3}$ is the refractive index of the material of said second lens element at the third wavelength $\lambda 3$.

3. The objective lens of claim 2, wherein at least one surface of the objective lens is aspheric.

4. The objective lens of claim 2, wherein the objective lens is arranged so that when wavelengths $\lambda 1$,
$N2_{\lambda 1}$ is the refractive index of the material of said second lens element at the first wavelenth $\lambda 1$,
$N1_{\lambda 2}$ is the refractive index of the material of said first lens element at the second wavelength $\lambda 2$,
$N2_{\lambda 2}$ is the refractive index of the material of said second lens element at the second wavelength $\lambda 2$,
$N1_{\lambda 3}$ is the refractive index of the material of said first lens element at the third wavelength $\lambda 3$, and
$N2_{\lambda 3}$ is the refractive index of the material of said second lens element at the third wavelength $\lambda 3$.

5. An optical pickup device that includes the objective lens according to claim 2.

6. An optical pickup device comprising:
the objective lens according to claim 2;
said first optical recording medium;
said second optical recording medium; and
said third optical recording medium.

7. The objective lens of claim 1, wherein at least one surface of the objective lens is aspheric. each of three light beams that provides the light of each of the three wavelegths $\lambda 1$, $\lambda 2$, and $\lambda 3$ is incident on one side of the objective lens, each light beam is a parallel, or nearly parallel, light beam.

8. The objective lens of claim 1, wherein the objective lens is arranged so that when each of three light beams that provides the light of each of the three wavelengths $\lambda 1$, $\lambda 2$, and $\lambda 3$ is incident on one side of the objective lens, each light beam is a parallel, or nearly parallel, light beam.

9. The objective lens according to claim 8, wherein:
the two lens elements are a first lens element and a second lens element; and
the following conditions are satisfied:

$$h2/h1 \leq 0.5$$

$$h3/h1 \leq 0.5$$

where $$h1 = \lambda 1/|N1_{\lambda 1} - N2_{\lambda 1}|,$$

$$h2 = \lambda 2/|N1_{\lambda 2} - N2_{\lambda 2}| \text{ and } |N1_{\lambda 2} - N2_{\lambda 2}| > \text{zero},$$

$$h3 = \lambda 3/|N1_{\lambda 3} - N2_{\lambda 3}| \text{ and } |N1_{\lambda 3} - N2_{\lambda 3}| > \text{zero},$$

$N1_{\lambda 1}$ is the refractive index of the material of said first lens element at the first wavelength $\lambda 1$,
$N2_{\lambda 1}$ is the refractive index of the material of said second lens element at the first wavelength $\lambda 1$,
$N1_{\lambda 2}$ is the refractive index of the material of said first lens element at the second wavelength $\lambda 2$,
$N2_{\lambda 2}$ is the refractive index of the material of said second lens element at the second wavelength $\lambda 2$,
$N1_{\lambda 3}$ is the refractive index of the material of said first lens element at the third wavelength $\lambda 3$, and
$N2_{\lambda 3}$ is the refractive index of the material of said second lens element at the third wavelength $\lambda 3$.

10. An optical pickup device that includes the objective lens according to claim 1.

11. The objective lens of claim 1, wherein the cross-sectional shape of the optical diffractive surface is a serrated shape.

12. The objective lens of claim 11, wherein at least one surface of the objective lens is aspheric.

13. The objective lens of claim 11, wherein the objective lens is arranged so that when each of three light beams that provides the light of each of the three wavelengths $\lambda 1$, $\lambda 2$, and $\lambda 3$ is incident on one side of the objective lens, each light beam is a parallel, or nearly parallel, light beam.

14. An optical pickup device that includes the objective lens according to claim 11.

15. An optical pickup device comprising:
the objective lens according to claim 1;
said first optical recording medium;
said second optical recording medium; and
said third optical recording medium.

16. The objective lens according to claim 1, wherein one of said two lens elements of different materials with surfaces that are cemented together is formed of a so-called multiplexed aspheric lens that may be made by replica processing.

* * * * *

UNITED STATES PATENT AND TRADEMARK OFFICE
CERTIFICATE OF CORRECTION

| | |
|---|---|
| PATENT NO. | : 7,457,223 B2 |
| APPLICATION NO. | : 10/922958 |
| DATED | : November 25, 2008 |
| INVENTOR(S) | : Katsuma et al. |

It is certified that error appears in the above-identified patent and that said Letters Patent is hereby corrected as shown below:

In col. 4
Line 34, change "$N1_{\lambda 1}$," to -- $N1_{\lambda 1}$ --;
Line 36, change "$N2_{\lambda 1}$," to -- $N2_{\lambda 1}$ --;

In col. 13

Change claim 4 to read as follows:

-- 4. The objective lens of claim 2, wherein the objective lens is arranged so that when each of three light beams that provides the light of each of the three wavelengths $\lambda 1$, $\lambda 2$, and $\lambda 3$ is incident on one side of the objective lens, each light beam is a parallel, or nearly parallel, light beam. --; and Change claim 7 to read as follows:

-- 7. The objective lens of claim 1, wherein at least one surface of the objective lens is aspheric. --

Signed and Sealed this

Tenth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,457,223 B2  
APPLICATION NO. : 10/922958  
DATED : November 25, 2008  
INVENTOR(S) : Katsuma et al.

It is certified that error appears in the above-identified patent and that said Letters Patent is hereby corrected as shown below:

In col. 4  
Line 34, change "$N1_{ë1}$," to -- $N1_{ë1}$ --;  
Line 36, change "$N2_{ë1}$," to -- $N2_{ë1}$ --;

In col. 13

Change claim 4, lines 29-40, to read as follows:

-- 4. The objective lens of claim 2, wherein the objective lens is arranged so that when each of three light beams that provides the light of each of the three wavelengths ë1, ë2, and ë3 is incident on one side of the objective lens, each light beam is a parallel, or nearly parallel, light beam. --; and

Change claim 7, lines 48-52, to read as follows:

-- 7. The objective lens of claim 1, wherein at least one surface of the objective lens is aspheric. --

This certificate supersedes the Certificate of Correction issued February 10, 2009.

Signed and Sealed this

Tenth Day of March, 2009

JOHN DOLL  
*Acting Director of the United States Patent and Trademark Office*